(12) United States Patent
Krieger et al.

(10) Patent No.: US 7,196,482 B2
(45) Date of Patent: **\*Mar. 27, 2007**

(54) PWM CONTROLLER WITH AUTOMATIC LOW BATTERY POWER REDUCTION CIRCUIT AND LIGHTING DEVICE INCORPORATING THE CONTROLLER

(75) Inventors: Michael Krieger, Miami Beach, FL (US); Bruce Randolph, Ft. Lauderdale, FL (US); Henry Shum, Hong Kong (HK)

(73) Assignee: Vector Products, Inc., Ft. Lauderdale, FL (US)

( * ) Notice: Subject to any disclaimer, the term of this patent is extended or adjusted under 35 U.S.C. 154(b) by 43 days.

This patent is subject to a terminal disclaimer.

(21) Appl. No.: 10/968,076

(22) Filed: Oct. 20, 2004

(65) Prior Publication Data

US 2005/0067983 A1 Mar. 31, 2005

Related U.S. Application Data

(63) Continuation of application No. 10/345,154, filed on Jan. 16, 2003, now Pat. No. 6,870,329, which is a continuation-in-part of application No. 10/277,087, filed on Oct. 22, 2002, now abandoned.

(60) Provisional application No. 60/375,450, filed on Apr. 26, 2002.

(51) Int. Cl.
*H05B 37/02* (2006.01)

(52) U.S. Cl. ................ 315/291; 315/301; 315/308

(58) Field of Classification Search ................ 315/295, 315/291, 362, 307, DIG. 7, 299, 301, 308; 307/106, 130, 116, 125

See application file for complete search history.

(56) References Cited

U.S. PATENT DOCUMENTS 3,201,580 A 8/1965 Moore ........................ 362/157

(Continued)

OTHER PUBLICATIONS

"Introduction to Pulse Width Modulation (PWM)," Michael Barr, http://www.netrino.com/Publications/Glossary/PWM.html, pp. 1-4, 2001, CMP Media, LLC.

(Continued)

*Primary Examiner*—Thuy Vinh Tran
(74) *Attorney, Agent, or Firm*—Venable, LLP; Robert Kinberg; Jeffri A. Kaminski (57) ABSTRACT

A controller for controlling a voltage applied to a load from a power source includes a square wave producing circuit for connection in the circuit with the battery and the lamp. The square wave producing circuit produces a variable duty cycle square wave for controlling application of power to the load in accordance with the duty cycle of the square wave. The square wave producing circuit has a control input for varying the duty cycle of the square wave in response to a voltage at the control input. A voltage varying circuit is connected to the power source for producing a selectively variable voltage that is fed to the control input of the square wave producing circuit for selectively adjusting the duty cycle of the square wave. A low voltage detection circuit is connected to the power source and coupled to the control input of the square wave producing circuit for automatically producing a voltage that decreases the duty cycle of the square wave when the battery voltage decreases to or below a selected level. The selected level may be set according to a value of at least one impedance within the low voltage detection circuit.

33 Claims, 9 Drawing Sheets

U.S. PATENT DOCUMENTS

| | | | |
|---|---|---|---|
| 3,793,515 A | 2/1974 | Park | 362/190 |
| 3,800,136 A | 3/1974 | Edelson | 362/157 |
| 3,821,600 A | 6/1974 | Wesner | 315/291 |
| 4,055,790 A | 10/1977 | Gerding et al. | 363/24 |
| 4,092,711 A | 5/1978 | Gerding et al. | 363/53 |
| 4,237,405 A | 12/1980 | Kellis | 315/307 |
| 4,238,709 A | 12/1980 | Wallace | 315/291 |
| 4,326,161 A | 4/1982 | Kreinberg | 323/299 |
| 4,410,835 A | 10/1983 | Zabroski | 315/87 |
| 4,471,422 A | 9/1984 | Hierholzer, Jr. | 363/56.08 |
| 4,499,525 A | 2/1985 | Mallory | 362/157 |
| 4,580,090 A | 4/1986 | Bailey et al. | 323/303 |
| 4,604,517 A | 8/1986 | Barry | 363/49 |
| 4,621,313 A | 11/1986 | Kiteley | 362/183 |
| 4,816,970 A | 3/1989 | Garcia, Jr. | 315/209 R |
| 4,887,006 A | 12/1989 | Kuratami | 315/209 R |
| 4,950,868 A | 8/1990 | Moss et al. | 219/211 |
| 5,021,679 A | 6/1991 | Fairbanks | 307/66 |
| 5,023,430 A | 6/1991 | Brekkestran et al. | 219/486 |
| 5,032,705 A | 7/1991 | Batcheller et al. | 219/211 |
| 5,038,728 A | 8/1991 | Yoshida et al. | 123/198 R |
| 5,097,180 A | 3/1992 | Ignon et al. | 315/200 A |
| 5,097,829 A | 3/1992 | Quisenberry | 607/105 |
| 5,105,067 A | 4/1992 | Brekkestran et al. | 219/497 |
| 5,548,206 A * | 8/1996 | Soo | 323/284 |
| 5,568,041 A * | 10/1996 | Hesterman | 323/207 |
| 5,854,617 A | 12/1998 | Lee et al. | 345/102 |
| 5,857,061 A | 1/1999 | Chang et al. | 388/829 |
| 5,944,407 A | 8/1999 | Lynch et al. | 362/198 |
| 5,986,241 A | 11/1999 | Funahashi | 219/497 |
| 6,040,660 A | 3/2000 | Schmidt et al. | 315/200 A |
| 6,107,787 A | 8/2000 | Wand | 323/299 |
| 6,222,162 B1 | 4/2001 | Keane | 219/481 |
| 6,246,184 B1 | 6/2001 | Salerno | 315/291 |
| 6,305,818 B1 | 10/2001 | Lebens et al. | 362/184 |
| 6,317,347 B1 | 11/2001 | Weng | 363/134 |
| 6,617,757 B2 | 9/2003 | Carazo et al. | 310/317 |
| 6,770,853 B2 * | 8/2004 | Krieger et al. | 219/497 |
| 2002/0008501 A1 | 1/2002 | Telefus et al. | 323/282 |

OTHER PUBLICATIONS

"IM193/LM293/LM393/LM2903 Low Power Low Offset Voltage Dual Comparators," National Semiconductor Corporation, www.national.com, pp. 1-13, Aug. 2000.

* cited by examiner

PWM CONTROLLER WITH AUTOMATIC LOW BATTERY POWER REDUCTION CIRCUIT AND LIGHTING DEVICE INCORPORATING THE CONTROLLER

CROSS-REFERENCE TO RELATED APPLICATION

This application is a continuation of U.S. patent application Ser. No. 10/345,154, filed Jan. 16, 2003, which is now U.S. Pat. No. 6,870,329, having the same title as the present application, and incorporated herein by reference in its entirety. That application is a continuation-in-part of U.S. patent application Ser. No. 10/277,087, filed Oct. 22, 2002, which is now abandoned, having the same title as the present application, and incorporated herein by reference in its entirety. Furthermore, that application is based on, and claims priority from, U.S. Provisional Patent Application No. 60/375,450, filed Apr. 26, 2002 and entitled, "PWM Lamp Controller for Spotlights with Automatic Low Battery Power Reduction Circuit," which is incorporated herein by reference in its entirety.

BACKGROUND OF THE INVENTION

1. Field of the Invention

The present invention is directed to a PWM control circuit useful in battery-powered devices. More specifically, the invention is directed to a PWM control circuit having battery conservation features. The invention is further directed to a battery-powered light source incorporating such a PWM control circuit, where the battery may be a rechargeable battery.

2. Description of Related Art

It is known to adjust the output power of a battery providing power to a device, such as a spotlight, table lamp or other such source of light. Considering, for example, the context of lighting devices, one known circuit incorporates pulse width modulation (PWM) to automatically increase the duty cycle of the signal that provides power to the lamp as the voltage of the battery decreases, to thereby maintain a constant power supply and light intensity. It is also known to manually decrease the duty cycle to reduce the intensity of the light as the battery voltage decreases. Examples of such control circuits are described in U.S. Pat. No. 4,499,525 to Mallory and in U.S. Pat. No. 6,040,660 to Schmidt et al., which are incorporated herein by reference. Note that, in the case of the former, the light intensity is maintained at the expense of battery conservation. It would be useful if there were a device that allowed for manually adjusting the light intensity of a battery operated lamp, and which automatically reduced the power drawn from the battery by the lamp as the voltage of the battery decreased in order to prolong battery life.

SUMMARY OF THE INVENTION

It is an object of the invention to provide a means by which to permit a user to manually adjust the intensity of a device, and which automatically reduces power drawn from a power source to the device as the power possessed by the power source decreases.

It is a further object of the invention to provide a means for varying the light intensity of a battery operated lamp that can be manually adjusted and a means for automatically reducing the power drawn from the battery by the lamp as the voltage of the battery decreases.

The above and other objects are accomplished in accordance with the invention by the provision of a PWM-based controller for controlling a voltage provided to a device from a power source. The controller comprises a square wave producing circuit that produces a variable-duty-cycle square wave for applying voltage to the device. A voltage varying circuit is included for producing a selectively variable voltage that is fed to a control input of the square wave producing circuit for controlling a duty cycle of the variable-duty-cycle square wave. The controller further includes a low voltage detection circuit that monitors the power source and is also coupled to the control input of the square wave producing circuit; the low voltage detection circuit automatically produces a voltage that decreases the duty cycle of the variable-duty-cycle square wave when the voltage of the power source decreases below a predetermined level.

In a further embodiment of the invention, the inventive controller is provided as part of a lamp, for controlling a voltage applied to a lamp from a battery connected in a circuit with the lamp. The lamp, in a sub-embodiment, may be equipped with a separate cold-cathode fluorescent lamp circuit (CCFL).

BRIEF DESCRIPTION OF THE DRAWINGS

Further objects, advantages and benefits of the invention will be come apparent from the following detailed description of the invention when considered in conjunction with the accompanying drawings, in which.

DETAILED DESCRIPTION OF THE INVENTION

The pulse width modulation (PWM) controller of the present invention gradually and automatically decreases the intensity of the output of a load, for example, a light emitting resistive load, thereby increasing battery life, while at the same time allowing a user to manually adjust the intensity of the load. According to the invention, this is achieved by converting the DC output of a battery to a controllable PWM signal and permitting a user to manually adjust the pulse width for selectively varying intensity, and by continually sensing the voltage of the battery and decreasing the duty cycle of a PWM controller as the voltage of the battery decreases.

Figure 1:
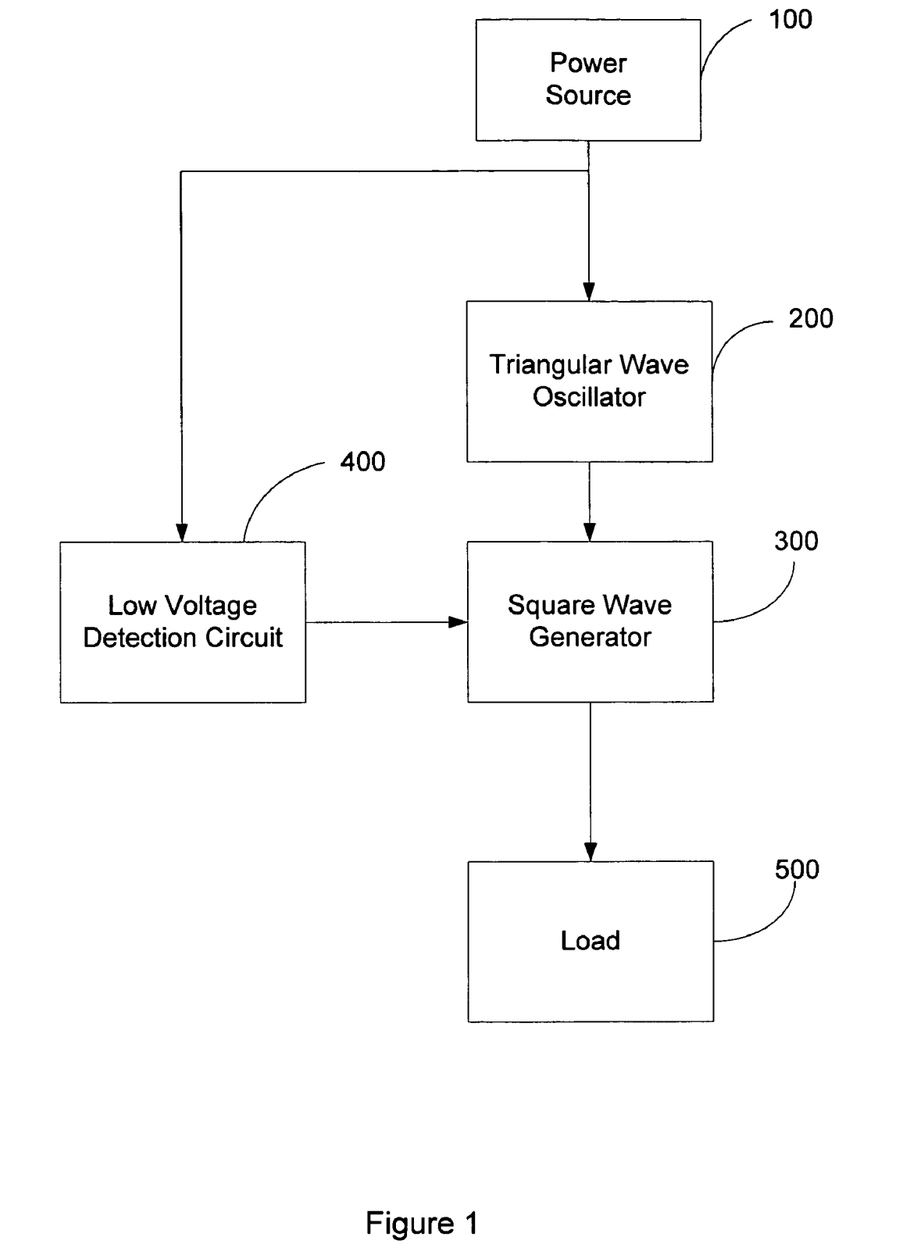
FIG. 1 is a block diagram of a control circuit according to an embodiment of the invention.

FIG. 1 depicts a block diagram of such a controller. While manual control is included in the controller, it is not explicitly shown in FIG. 1. FIG. 1 shows a power source 100 supplying power to a triangular wave oscillator 200. The output of triangular wave oscillator 200 is supplied to square wave generator 300. Square wave generator 300 is controllable to adjust the duty cycle of a square wave output. Low voltage detection circuit 400 monitors the output of power source 100 and provides a control output to square wave oscillator 300. The control output is dependent on the detected output of power source 100 and is used to control the duty cycle of the square wave output of square wave oscillator 300. A manual control input (not shown), also controlling the duty cycle of the output of square wave oscillator 300, is also provided to square wave generator 300; this may be provided either directly to square wave generator 300 or through low voltage detection circuit 400. The output of square wave oscillator 300 is provided to load 500. In many applications, the square wave output of square wave oscillator 300 will be used to control a switching circuit (e.g., a transistor configured to switched on and off) to turn the load on and off according to the duty cycle of the square wave output, and to thereby vary the intensity of the load according to the duty cycle of the square wave output.

Figure 2:
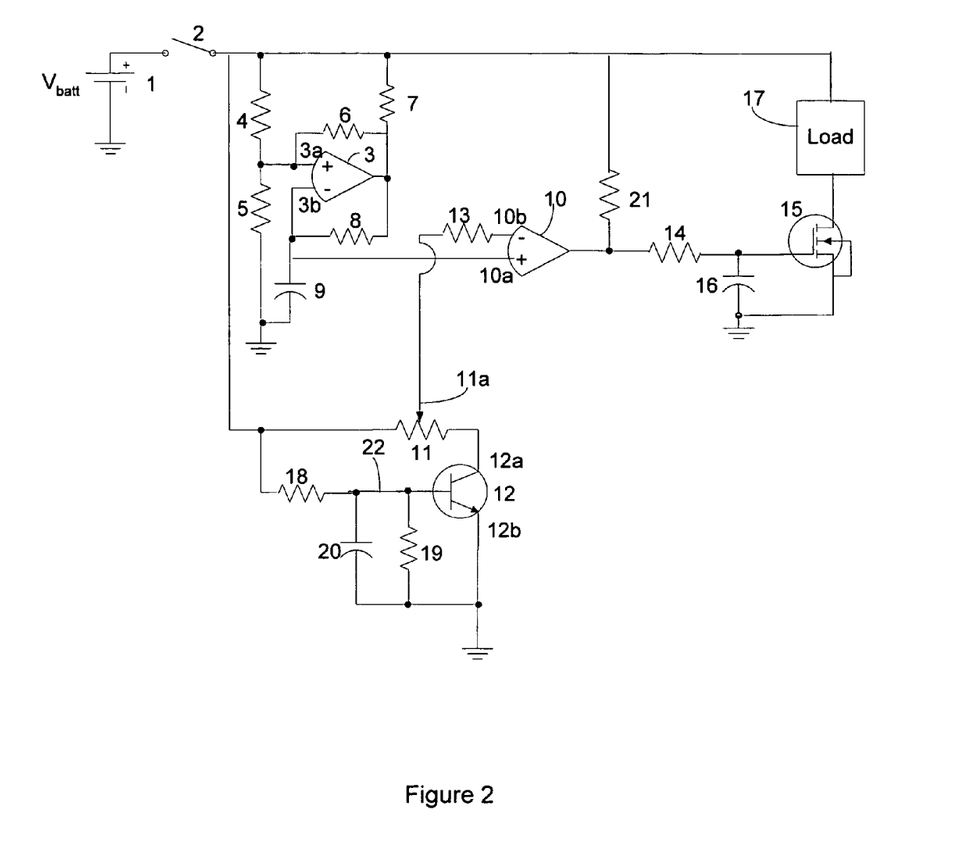
FIG. 2 is a circuit schematic in partial block circuit form showing the control circuit, in the context of a lamp controller, according to a first embodiment of the invention.

FIG. 2 shows a circuit diagram of a PWM controller with automatic low battery power reduction employing the principles of the invention, according to a first embodiment. A battery 1, for example, provides power to the circuitry of the invention through "on/off" switch 2. Comparator 3 is connected to resistors 4, 5, 6, 7, and 8 and to capacitor 9 to comprise a triangle wave oscillator. Comparator 3 has a positive input 3a that is connected to a common junction between resistors 4 and 5, which form a voltage divider between the positive terminal of battery 1 and ground (or, correspondingly, the negative terminal of the battery). The output of comparator 3 is fed back to positive input 3a via resistor 6 and to the negative input 3b via resistor 8, which is also connected via capacitor 9 to ground. As a result of this configuration, a triangular voltage is developed across capacitor 9. This triangular voltage is fed to the non-inverting (positive) input 10a of a comparator 10. Comparator 10 has an inverting (negative) input 10b connected through a resistor 13 to a manually variable tap 11a of a potentiometer 11 connected between the positive terminal of battery 1 and the collector 12a of a transistor 12 whose emitter 12b is connected to ground. In operation, a fixed frequency, variable duty cycle square wave is produced at the output of comparator 10 (i.e., when the voltage at positive input 10a exceeds the voltage at negative input 10b, a voltage is output by comparator 10, whereas such voltage is not output otherwise, thus producing a square wave). The duty cycle of this square wave may be manually controlled using the manually variable tap 11a of potentiometer 11. The square wave output from comparator 10 is then fed through resistor 14 into the gate of a Field Effect Transistor (FET) 15. A common NPN-type transistor may be used in place of FET 15. A biasing resistor 21 may be connected between the positive terminal of battery 1 and resistor 14 to adjust the voltage applied to the base of FET 15. A capacitor 16 is connected between resistor 14 and FET 15 and ground. The purpose of capacitor 16 is to reduce electromagnetic and/or radio frequency interference (EMI/RFI). The source of FET 15 is grounded, and a load (e.g., a lamp) 17 is connected directly to the drain of FET 15. The other side of load 17 is connected to the positive terminal of battery 1. The circuit described above results in the "on time" of the load being completely variable from 0% to 100%. If the "on time" of the load is any duration less than 100%, the power drawn from battery 1 by the load is reduced. Specifically, at a 50% duty cycle, the power drain from the battery is effectively reduced by the same percentage, thus resulting in a longer usable run time at a reduced output (e.g., in the case of a lamp, a reduced beam candlepower output).

According to a further aspect of the invention, the life of battery 1 may be extended by automatically and continually reducing the duty cycle of the PWM output of comparator 10 when the voltage of battery is reduced to a certain level, for example, 80% of its maximum level. To accomplish this, there is provided a low voltage detection circuit that gradually turns transistor 12 off when the battery voltage is depleted to a certain level; that is, as the battery voltage decreases below a predetermined level, the voltage being supplied to potentiometer 11 by transistor 12 will be gradually increased, as will be further described below.

In FIG. 2, the low voltage detection circuit comprises resistors 18 and 19 connected in series between the positive terminal of battery 1 and ground, with a capacitor 20 connected between ground and the common terminal 22 of resistors 18 and 19. The base of transistor 12 is also connected to common terminal 22. The values of resistors 18 and 19 are selected so that when the voltage of battery 1 is depleted to a certain level, for example, 80% of its rated value, the base voltage of transistor 12 is reduced to the point where transistor 12 begins to turn off. Gradually turning transistor 12 off gradually raises the voltage at the wiper arm of potentiometer 11, reducing the output duty cycle at the output of comparator 10 (i.e., by increasing the comparator threshold voltage at negative input 10b), thereby reducing the output power to the load. As the battery voltage decays to an even lower level, for example, 10% of its rated voltage level, transistor 12 turns off completely and reduces the output of comparator 10 to a zero (0) duty cycle.

Figure 3:
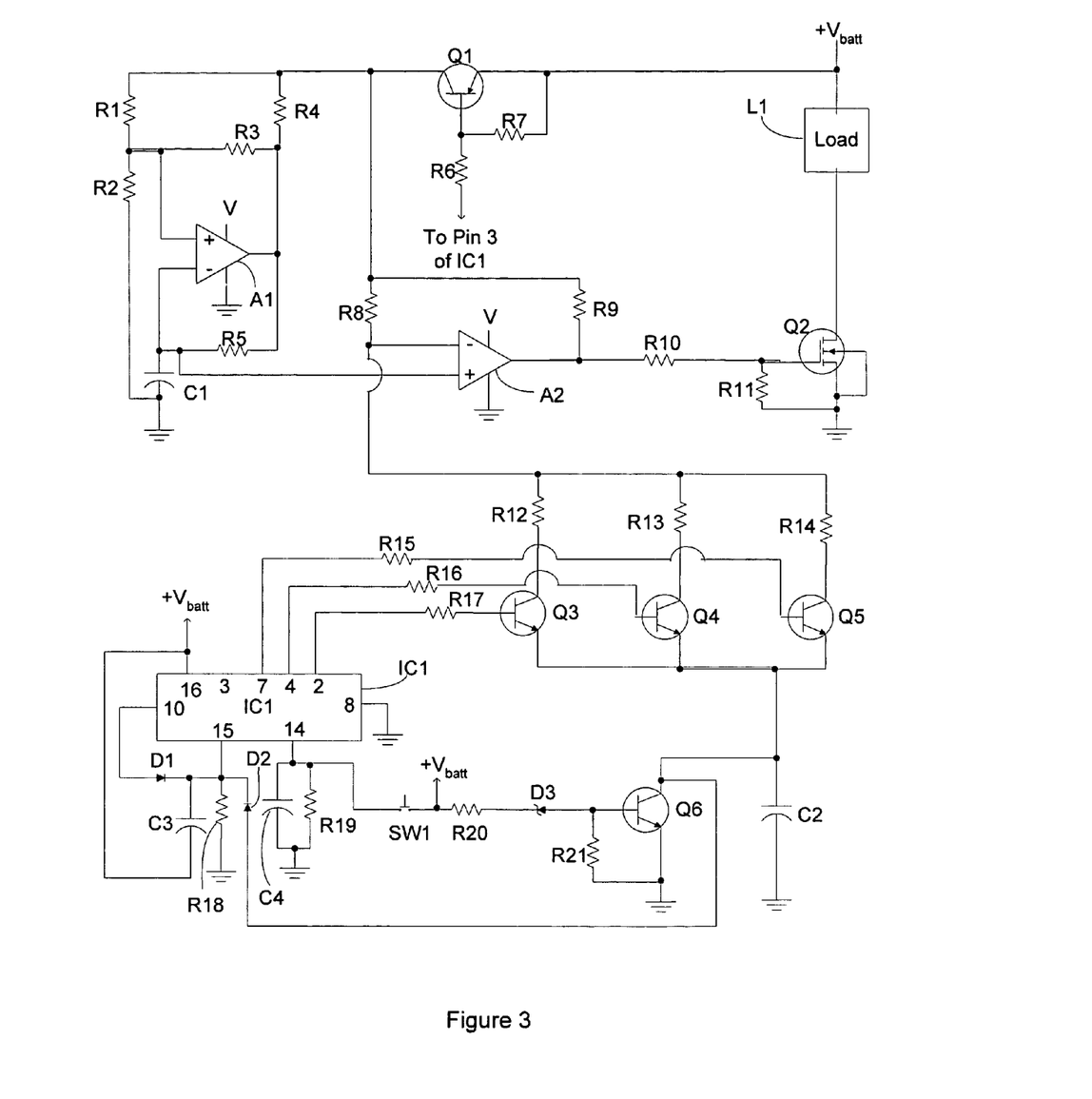
FIG. 3 is a circuit schematic in partial block circuit form showing the control circuit according to a second embodiment of the invention.

FIG. 3 depicts a circuit diagram according to a second embodiment of the invention. This second embodiment also incorporates automatic dimming and shutdown, similar to the first embodiment, while adding additional power saving features. In FIG. 3, elements R1–R5, A1, and C1 correspond, respectively, to elements 4–8, 3, and 9 and, therefore, comprise a triangular wave oscillator. Similarly, elements R8, R9, and A2 of FIG. 3 correspond, respectively, to elements 13, 21, and 10 of FIG. 2 and, therefore, comprise a square wave generator that receives the output of the triangular wave oscillator as input. Transistor Q2 corresponds to transistor 15 of FIG. 2 and performs the same function. The base of transistor Q2 is fed by the output of a voltage divider formed by resistors R10 and R11, which help regulate the voltage being applied. Note that a separate on-off switch, component 2 in FIG. 2, is not shown in FIG. 3 but may be interposed between a power source (not shown) and the rest of the circuit.

The primary difference between the embodiments of FIGS. 2 and 3 lies in the control circuitry, which, in FIG. 3, is centered around IC1. In a preferred embodiment, IC1 comprises a decade counter, for example, a 4017B decade counter. The involvement of IC1 with the various functions of the circuit will become clear from the discussion below. The 4017B decade counter will be used below in describing the circuit and its operation; however, a skilled artisan would appreciate that other integrated circuits could be substituted for the 4017B decade counter, with appropriate modifications of the circuit, as needed.

As shown in FIG. 3, input to amplifier A1 and A2 is controlled by transistor Q1. Transistor Q1 is configured with its collector coupled to the battery voltage (possibly via a switch as in FIG. 2) and its emitter coupled to one end of resistor R1, to one end of resistor R4, to one end of resistor R8, and to one end of resistor R9. The battery voltage is also coupled to the base of Q1 via resistor R7. The base is further coupled to Pin 3 of IC1 via resistor R6. Q1, as thus configured, functions as a switch and is on whenever the output of Pin 3 of IC1 is low (i.e., whenever the circuit is not off). This serves a function of reducing standby power consumption when IC1 is reset; as a result, when IC1 is reset, power consumption is on the order of micro-amperes. When Pin 3 of IC1 goes high, or when IC1 is reset (see below), transistor Q1 is rendered non-conductive, such that a signal is not output from the emitter of Q1, and load L1 is shut off.

As was the case in FIG. 2, the embodiment of FIG. 3 also provides means by which manual control may be accomplished. In FIG. 2, such means were provided by potentiometer 11. In FIG. 3, such means are provided by the combination of IC1 with transistors Q3–Q5 and resistors R12–R17, in further combination with selector switch SW1. Resistors R12–R14 are coupled to the collectors of transistors Q3–Q5, respectively. The bases of transistors Q3–Q5 are coupled, through resistors R17–R15, respectively, to Pins 2, 4, and 7, respectively, of IC1. In this configuration, under control of IC1, only one of the transistors will be conductive at any given time. As a result, a voltage divider circuit is formed by one of resistors R12–R14 in combination with resistor R8, depending on which of transistors Q3–Q5 is conductive. Because resistors R12–R14 have different values, the output of the voltage divider, which provides the threshold voltage of the comparator circuit forming the square wave generator comprising amplifier A2, varies according to which of transistors Q3–Q5 is conductive. A user employs selector switch SW1 to select which one of transistors Q3–Q5 is conductive.

In particular, selector switch SW1 is coupled between the power source (+$V_{batt}$) and Pin 14 of IC1, which represents the clock input of the 4017B decade counter. Pin 14 is further coupled to ground via capacitor C4 and resistor R19. IC1 works by sequentially placing high signals on its ten output pins. Pins 2, 4, and 7 go high, in that order, as clock pulses are applied to Pin 14, as a result of a user sequentially pushing selector switch SW1. When one of these pins goes high, the transistor (Q5, Q4, or Q3) to which it is coupled will conduct, and the corresponding resistor (R14, R13, or R12) will form the voltage divider with resistor R8, as discussed above, thus varying the threshold voltage (negative input) to amplifier A2 in a discrete fashion (thus changing the duty cycle of the output square wave in a discrete fashion).

In FIG. 3, transistor Q6 provides functionality corresponding to that of transistor 12 in FIG. 2. In particular, the collector of transistor Q6 is coupled to the emitters of transistors Q3–Q5. As was the case with transistor 12 of FIG. 2, transistor Q6 performs the function of changing the duty cycle of the output square wave supplied by amplifier A2, regardless of which of transistors Q3–Q5 is conducting, thus providing automatic power reduction.

In particular, the base of transistor Q6 is coupled to the power source via resistor R20 and Zener diode D3. It is also coupled to ground via resistor R21. The emitter of transistor Q6 is also coupled to ground. The collector of transistor Q6, in addition to being coupled to the emitters of transistors Q3–Q5, is also coupled to ground via capacitor C2. It is further coupled to Pin 15 of IC1 via diode D2; this connection will be discussed further below.

Given the configuration of transistor Q6, when power supply voltage is above a predetermined level, settable by setting the values of resistors R20 and R21, Q6 is in a conductive state. As the power supply voltage decreases below the predetermined level, Q6 is rendered gradually less conductive, until, at some predetermined point, Q6 shuts off, altogether (i.e., becomes non-conductive). As was the case with transistor 12 of FIG. 2, this has the effect of increasing the voltage level at the negative input to amplifier A2, resulting in a shorter duty cycle, until the voltage level becomes high enough that the duty cycle is reduced to zero. Transistor Q6 thus serves the purpose of providing a low voltage detection circuit that automatically reduces, and ultimately inhibits, the output of the load L1 (e.g., in the case where load L1 is a lamp, it is gradually dimmed and ultimately extinguished).

IC1 further comprises a reset input at Pin 15. Pin 15 is connected to the collector of transistor Q6 via diode D2, as mentioned above. It is further connected to Pin 10 of IC1 via diode D1 and to ground via resistor R18. Finally, it is connected to the power supply voltage via capacitor C3. When IC1 receives a reset signal at Pin 15, it goes into an initial state (discussed further below), which corresponds to placing the circuit in a power conservation ("sleep") mode. Therefore, as transistor Q6 gradually shuts off, the voltage at its collector increases until it reaches a level such that a reset signal is generated at Pin 15, sending the circuit into its power conservation mode.

Reset signals may be generated at Pin 15 in two ways in addition to when the power supply voltage becomes too low. First, capacitor C3 (in conjunction with resistor R18) causes this to happen upon power-up. Second, the user may, by using the selector switch, cause a high output at Pin 10 (which is the next pin, in sequence, to go high, following Pins 2, 4, and 7). When IC1 is reset, load L1 is turned off. This is because, upon reset, Pin 3 goes high (which is also the initial power-up state of Pin 3), and Q1 does not output a voltage at its emitter, as discussed above.

In an exemplary implementation of the embodiment of FIG. 3, with load L1 being a lamp and automatic dimming set to begin when the power supply voltage goes below 80% of its nominal value, the resistors and capacitors shown may have the following values:

R1: 56 kΩ
R2: 56 kΩ
R3: 56 kΩ
R4: 2.2 kΩ
R5: 56 kΩ
R6: 10 kΩ
R7: 10 kΩ
R8: 10 kΩ
R9: 2.2 kΩ
R10: 1 kΩ
R1: 220 kΩ
R12: 12 kΩ
R13: 7.5 kΩ
R14: 1 kΩ
R15: 10 kΩ
R16: 10 kΩ
R17: 10 kΩ
R18: 56 kΩ
R19: 56 kΩ
R20: 2.7 kΩ
R21: 1 kΩ
C1: 0.1 μF

C2: 10 µF
C3: 0.1 µF
C4: 100 pF

Note that, as was the case with the circuit of FIG. 2, FETs may be interchanged with BJTs, NPN-type BJTs may be interchanged with PNP-type BJTs, and N-channel FETs may be interchanged with P-channel FETs, with attendant changes in the accompanying circuitry. Furthermore, although FIG. 3 shows only three transistor-resistor pairs that provide discrete levels of output (i.e., Q3 and R12, Q4 and R13, and Q5 and R14), any desirable number of such pairs may be provided.

Figure 4:
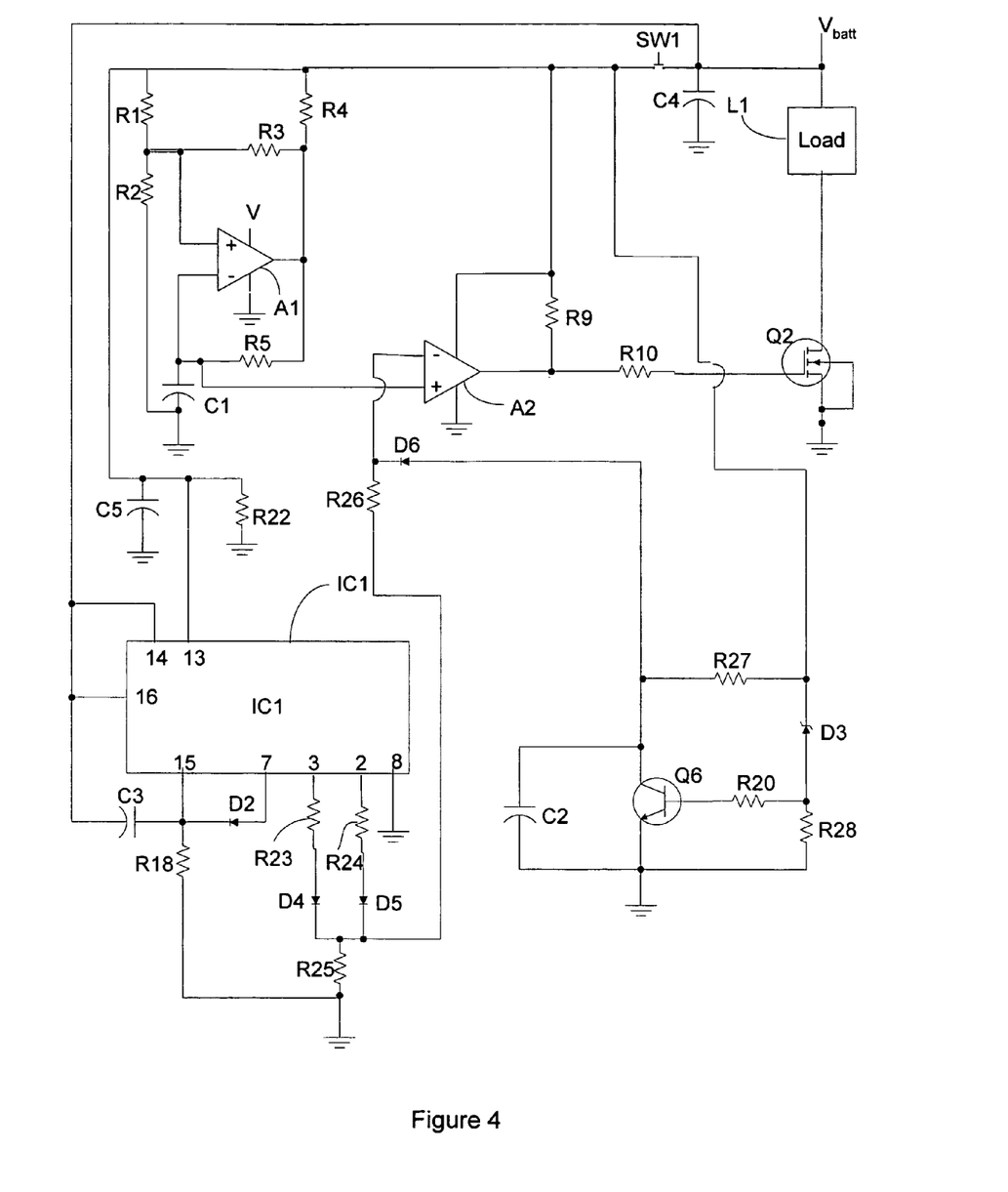
FIG. 4 is a circuit schematic in partial block circuit form showing the control circuit according to a third embodiment of the invention.

FIG. 4 depicts a circuit diagram according to a third embodiment of the invention. This third embodiment also incorporates automatic dimming and shutdown, similar to the first embodiment, while adding additional power saving features. Similarly to the second embodiment, the third embodiment also incorporates multiple discrete power levels.

In FIG. 4, components in common with FIG. 3 have been given identical reference labels. As was the case in FIG. 3, resistors R1–R5, capacitor C1, and amplifier A1 form a triangular wave oscillator. The triangular wave output is fed to the positive input of amplifier A2, as was the case in FIG. 3, amplifier A2 configured, with resistor R9, as a comparator. A threshold voltage is supplied to the negative terminal of amplifier A2 for setting a duty cycle of the square wave output of amplifier A2, which is fed, via resistor R10, to a control terminal of transistor Q2. Again, load L1 is turned on when transistor Q2 is rendered conductive and is turned off when Q2 is rendered non-conductive. Q2 is rendered conductive or non-conductive depending on the control voltage supplied from amplifier A2 via resistor R10. Q6 forms the nucleus of a low voltage monitoring circuit and functions similarly to how it functions in FIG. 3.

Again, control of the circuit is centered around an integrated circuit, IC1, which is preferably a decade counter, for example, a 4017B decade counter. As was the case above, the 4017B decade counter will be used below in describing the circuit and its operation; however, a skilled artisan would appreciate that other integrated circuits could be substituted for the 4017B decade counter, with appropriate modifications of the circuit, as needed.

The threshold voltage at the negative input of amplifier A2 is formed by a voltage divider circuit comprising resistors R23–R25. Diodes D4 and D5 are interposed as shown in FIG. 4 in order to provide isolation of the outputs of Pins 2 and 3 of IC1, which are coupled, respectively, to resistors R24 and R23. R23 and R24 have different resistance values, resulting in different voltage divider outputs, depending upon which of Pins 2 and 3 is active at a particular time. The threshold voltage is coupled to the negative input of amplifier A2 via resistor R26.

In FIG. 4, a selector switch SW1 is interposed between the power source ($V_{batt}$) and inputs to amplifiers A1 and A2, to an enable input (Pin 13) of IC1 and resistor R27, which is connected to the collector of transistor Q6. If selector switch SW1 is implemented as a push button, in an exemplary embodiment, then power is not supplied through the inputs to A1 and A2 except when the push button is depressed and held (i.e., in this exemplary embodiment, the button must be held down for the load L1 to be provided with power). That is, transistor Q2 remains in its "off" (non-conductive) state when the button is not kept depressed.

IC1 is shown configured in a falling edge trigger mode. That is, the CLOCK input at Pin 14 is connected directly to the power source (as is Pin 16, the power input), so that it is maintained at a high level. The ENABLE input at Pin 13 is such that IC1 is enabled when the input to Pin 13 is low and disabled when it is high (that is, if Pin 13 is used merely as an ENABLE input, IC1 is enabled whenever the input to Pin 13 is kept low, which, in the case of the 4017B, may be done merely by providing no input to Pin 13, as shown in FIG. 3). Hence, when the input signal to Pin 13 transitions from high to low, when the input to Pin 14 is kept high, Pin 13 acts as a clock input, triggering when the input signal goes to a low level. The input to Pin 13 is configured, as shown, with capacitor C5 and resistor R22 coupled to ground in parallel.

In an alternative embodiment, IC1 may be employed in its rising edge trigger mode, as in FIG. 3, where Pin 14 is used as the clock input; attendant changes in the circuitry would be apparent to one skilled in the art.

As discussed in connection with FIG. 3, Pins 3, 4, and 7 are outputs of IC1. As a decade counter, IC1 has ten outputs, which go high sequentially as a clock pulse is applied. Pin 3 represents the initial high output, upon power-up or another reset condition, as will be discussed below. Pin 4 represents the output one clock pulse following a high Pin 3 output, and Pin 7 represents the output two clock pulses following a high Pin 4 output.

Pin 15 of IC1 is a RESET input, which, when it receives a high signal, places IC1 in its initial state (i.e., with Pin 3 high). In FIG. 4, Pin 15 is coupled to the power source via capacitor C3, to ground via resistor R18, and to Pin 7 via diode D2. When initially connected to the power source, Pin 15 receives a brief voltage pulse, provided via resistor R18 and capacitor C3, which resets IC1. Similarly, a reset condition is also elicited when Pin 7 goes high.

When Pin 3 goes high, the output of Pin 3 is fed through a voltage divider formed by resistors R23 and R25 (with diode D4 interposed in between), and the divided voltage is provided to the negative input of amplifier A2 as the threshold voltage. However, unless selector switch SW1 is held down, no power is supplied to amplifier A2, so transistor Q2 is not controlled so as to conduct, and load L1 remains off. When selector switch is then pushed and held down, IC1 does not step to its next output state (i.e., Pin 2), but power is applied to amplifiers A1 and A2, and power is applied to load L1 under the control of transistor Q2, which is controlled by the square wave output of amplifier A2, as long as selector switch SW1 is held down.

When the selector switch SW1 is then released, IC1 increments, and Pin 2 becomes the high output. The threshold voltage to amplifier A2 is then supplied as the output of the voltage divider formed by resistors R24 and R25 (with diode D5 interposed in between); since resistors R23 and R24 have different resistance values, as discussed above, the voltage produced by the voltage divider when Pin 2 is high is different from the voltage produced by the voltage divider when Pin 3 is high. However, no power is being supplied to the amplifiers, so load L1 remains off. When selector switch SW1 is then depressed and held, power is again supplied to the amplifiers and, ultimately, to load L1.

Since the voltage produced by the voltage divider when Pin 3 is high is different from that produced when Pin 2 is high, the threshold voltages supplied to amplifier A2 are different, depending on whether Pin 2 or Pin 3 is high. Therefore, the duty cycle of the square wave output of amplifier A2 when Pin 2 is high is different from the duty cycle of the square wave output of amplifier A2 when Pin 3 is high. Accordingly, the outputs of load L1 will be different in these two cases. If L1 is a lamp, this corresponds to different brightness levels.

When the selector switch is released, following a Pin 2 high condition, IC1 increments to its next output state (not shown). This next output state is not connected to any part of the circuit. As a result, when the selector switch SW1 is then pushed and held down, the threshold voltage supplied to amplifier A2 will be zero, and the duty cycle of the square wave output of amplifier A2 will be 100%. In this case, load L1 is kept on at its highest intensity level as long as selector switch SW1 is held down.

When selector switch SW1 is again released, IC1 increments to its next output state, which brings Pin 7 high, thus sending a reset pulse to Pin 15 and resetting IC1 back to its initial state (Pin 3 high). The time between Pin 7 going high and IC1 resetting is on the order of nanoseconds.

Note that the implementation shown in FIG. 4 accounts for three intensity levels; however, additional outputs of IC1 could be used, along with resistors of various values and diodes connected to resistor R25 (thus increasing the number of branches of the voltage divider) to provide additional threshold voltage levels (and correspondingly, duty cycles and intensity levels). For example, a fourth intensity level would be available if Pin 4 (the next high output following Pin 2) were connected to a resistor and diode connected to resistor R25 and Pin 15 were connected, via diode D2, to Pin 10, instead of Pin 7. Furthermore, two or more integrated circuits of the same type as IC1 could be cascaded (and their outputs similarly connected to the voltage divider) to provide even more threshold voltage levels.

As mentioned above, Q6 again forms the nucleus of a low voltage detection circuit, along with resistors R20, R27, and R28, capacitor C2, and Zener diode D3. As was the case in the embodiment of FIG. 3, when selector switch SW1 is held down, the power source voltage level is detected by the circuit formed by these components. As long as the power source voltage level is above the emitter-base voltage drop of transistor Q6 and the value of the voltage drop across diode D3, transistor Q6 will remain in its "on" (conducting) state, and the voltage at its collector will be close to zero. As such, the collector voltage, connected to the negative input of amplifier A2 via diode D6, will not influence the threshold voltage being supplied to amplifier A2. As the power source voltage decreases, however, transistor Q6 begins to turn off, and therefore, its collector voltage will rise. As was the case in the embodiment of FIG. 3, this will gradually increase the threshold voltage and, accordingly, decrease the duty cycle of the square wave output of amplifier A2. Eventually, as the power source voltage continues to decrease, transistor Q6 will turn completely off, and its collector voltage will then maintain the threshold voltage at amplifier A2 such that the duty cycle of the output square wave will be zero. In this case, load L1 will be turned off.

It is noted that a capacitor C4 is provided between the power source and ground. Capacitor C4 serves as a noise filter and to add stability to the circuit.

In an exemplary implementation of the embodiment of FIG. 4, with load L1 being a lamp, the resistors and capacitors shown may have the following values:

R1: 56 kΩ
R2: 56 kΩ
R3: 56 kΩ
R4: 2.2 kΩ
R5: 56 kΩ
R9: 1 kΩ
R10: 1 kΩ
R18: 56 kΩ
R20: 2.2 kΩ
R22: 56 kΩ
R23: 10 kΩ
R24: 15 kΩ
R25: 15 kΩ
R26: 10 kΩ
R27: 2.2 kΩ
R28: 2.2 kΩ
C1: 0.1 µF
C2: 1 µF
C3: 0.1 µF
C4: 100 µF
C5: 100 pF

Figure 5A:
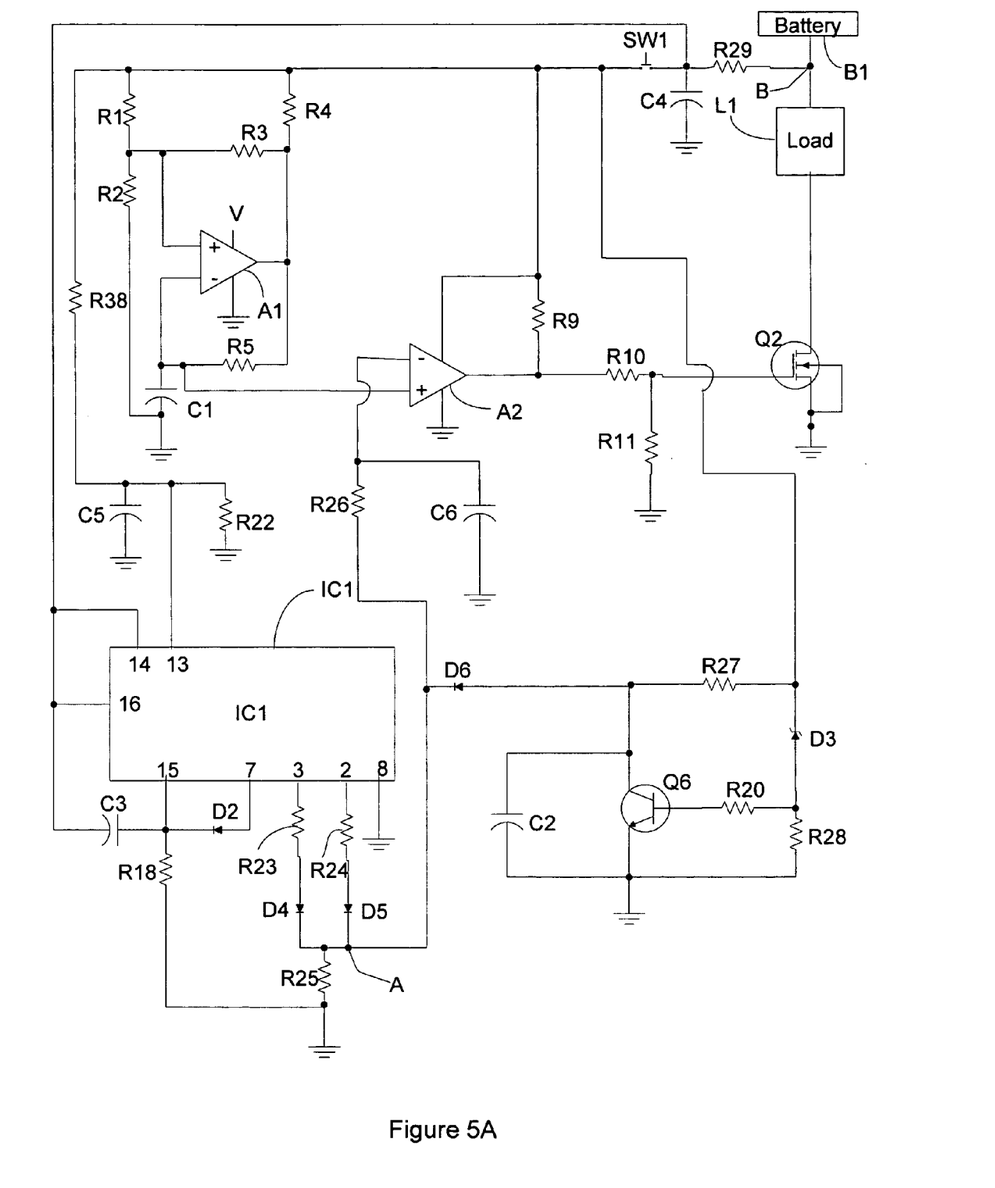
FIGS. 5A and 5B together comprise a circuit schematic in partial block circuit form showing the control circuit according to a fourth embodiment of the invention.
Figure 5B:
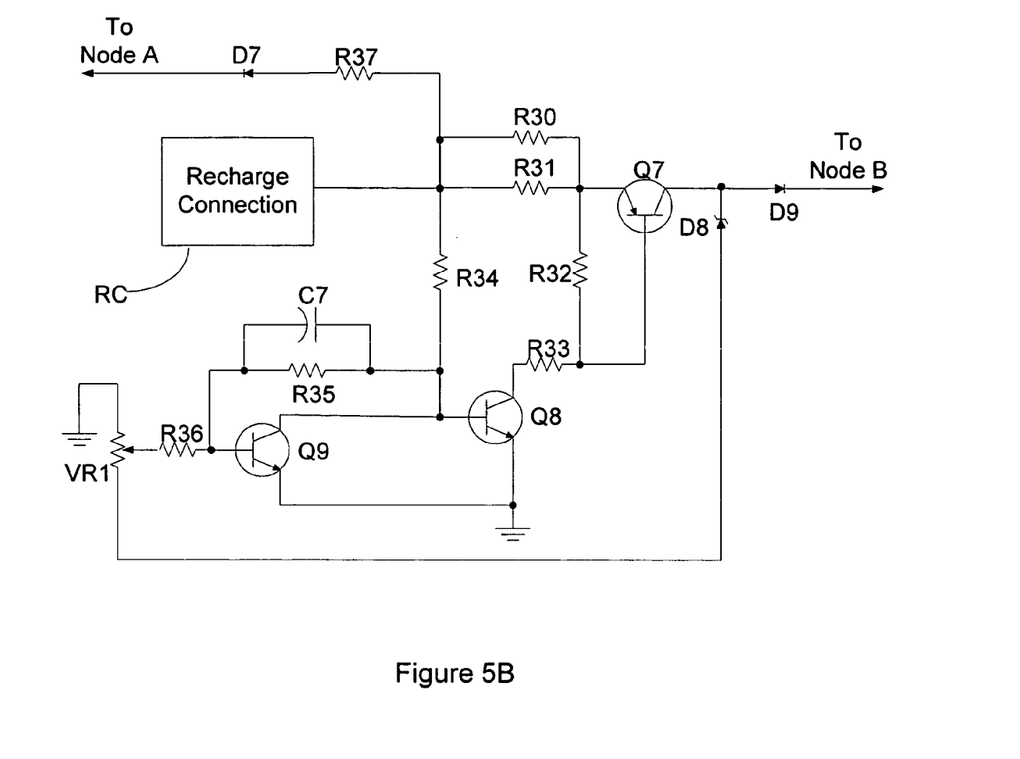

FIGS. 5A and 5B depict a fourth embodiment of the invention. The circuit shown in FIG. 5A is similar to, and operates similarly to, the circuit shown in FIG. 4; therefore, a detailed description of FIG. 5A will be omitted. In particular, FIG. 5A differs from FIG. 4 only in the following aspects: (1) the addition of resistors R11, R29, and R38; (2) the addition of capacitor C6; and (3) a change in the location of diode D6. FIG. 5A also explicitly depicts a battery B1 as the power source supplying $V_{batt}$ and includes labeled nodes A and B, which labels are used in connection with FIG. 5B.

The changes between the third and fourth embodiments, as discussed above, exist in part to accommodate a charging circuit. The charging circuit is shown in FIG. 5B and is connected to nodes A and B in FIG. 5A, as indicated. A voltage source is provided at re-charge connector RC. Examples of such a voltage source include an AC adapter and a car cigarette lighter plug. Resistors R30 and R31, which may, alternatively, be implemented in the form of a single resistor having desired characteristics (e.g., in an exemplary implementation, R30 and R31 are 56 Ω, 3 W resistors, giving a total of 28 Ω, 6 W for the combination), are used to limit voltage and current (in the exemplary implementation, the resulting available current is approximately 300 mA). The resulting current is fed to the emitter of transistor Q7, and the output is taken from the collector of Q7, through diode D9, to battery B1 (in FIG. 5A) to charge battery B1. Diode D9 serves the purpose of preventing current from flowing back into the charger when no charging source is connected. Resistor R32 connects one terminal of the combination of R30 and R31 with the base of transistor Q7. Transistor Q7 is "turned on" through resistor R33 and transistor Q8. When transistor Q8 is "on," transistor Q7 allows charge to flow between its emitter and collector. Transistor Q8 is biased "on" via resistor R34 and is biased "off" when transistor Q9 is turned "on." Transistor Q9 is turned "on" and "off" by the combination of variable resistor VR1 and Zener diode D8. When a desired battery voltage is reached by battery B1, Zener diode D8 becomes biased, and enough voltage becomes present at variable resistor VR1 to bias transistor Q9 "on." In turn, transistor Q8 is biased "off," and the output current of the charger reduces to a level required to hold the desired voltage at battery B1. Resistor R35 and capacitor C7 serve to provide stability and prevent oscillation. The combination of resistor R37 and diode D7 serves to prevent operation of the load L1 (see FIG. 5A) during the charge process.

In an exemplary implementation of the embodiment of FIGS. 5A and 5B, where load L1 is a lamp, the various resistors and capacitors take the following values:

R1: 56 kΩ
R2: 56 kΩ
R3: 56 kΩ
R4: 2.2 kΩ
R5: 56 kΩ
R9: 1 kΩ
R10: 1 kΩ

R10: 220 kΩ
R18: 56 kΩ
R20: 2.2 kΩ
R22: 56 kΩ
R23: 56 kΩ
R24: 100 kΩ
R25: 100 kΩ
R26: 10 kΩ
R27: 2.2 kΩ
R28: 2.2 kΩ
R29: 22 Ω
R30: 56 Ω
R31: 56 Ω
R32: 470 Ω
R33: 1 kΩ
R34: 10 kΩ
R35: 470 kΩ
R36: 10 kΩ
R37: 4.7 kΩ
R38: 4.7 kΩ
VR1: 10 kΩ
C1: 0.1 μF
C2: 10 μF
C3: 0.1 μF
C4: 100 μF
C5: 0.1 μF
C6: 2200 pF
C7: 0.1 μF

Figure 8:
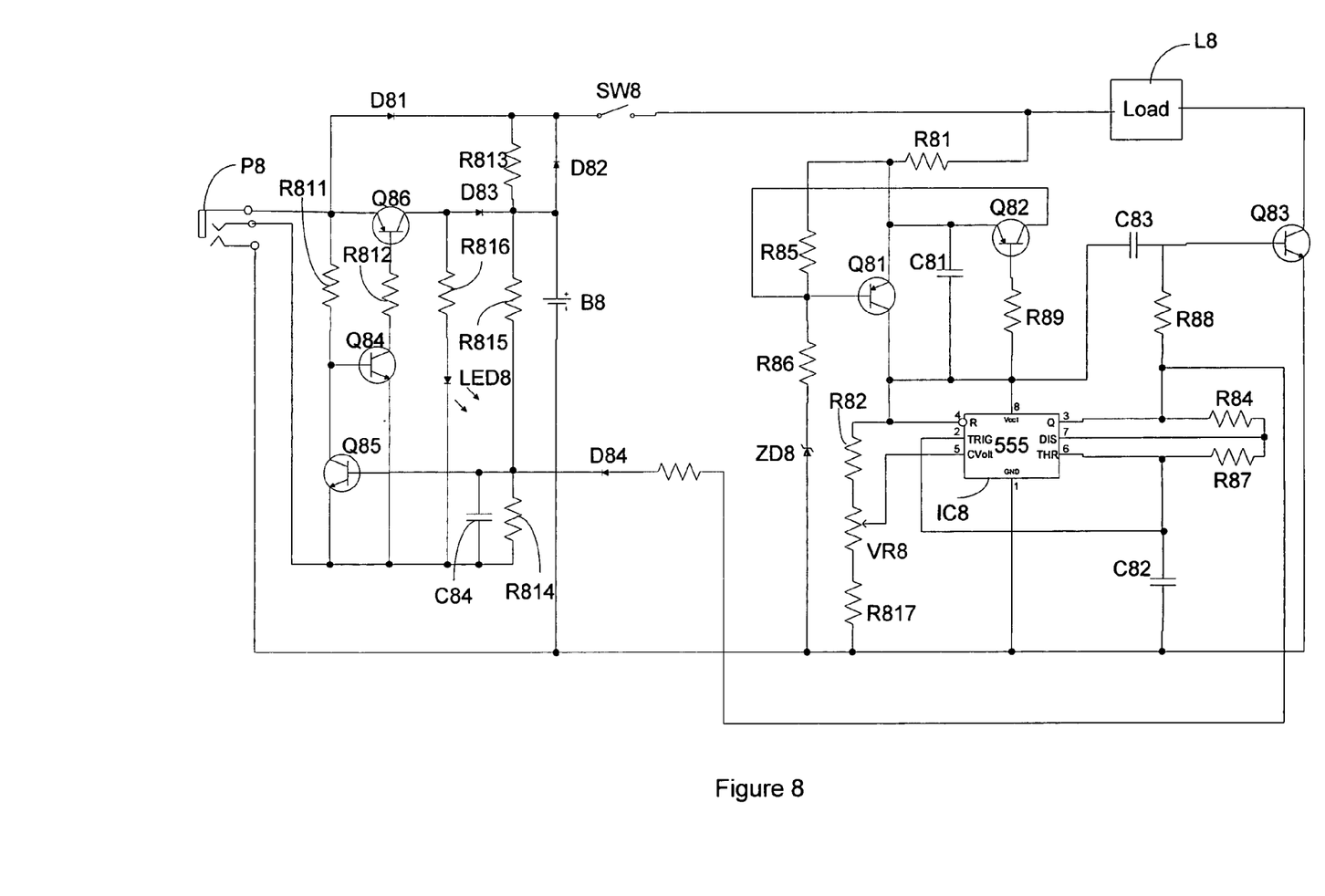
FIG. 8 depicts a circuit schematic in partial block circuit form showing the control circuit according to a fifth embodiment of the invention.

FIG. 8 depicts a circuit diagram implementing a fifth embodiment of the invention. This embodiment is centered around an integrated circuit, IC8, which is preferably a timer circuit, for example, the 555 timer circuit shown in FIG. 8. In this embodiment, IC8 replaces the waveform generation amplifier circuits in the previous embodiments and acts as a controlled square-wave generator whose output controls current flow through load L8 (which, in one embodiment, may be a lamp).

In particular, the timer circuit IC8 in FIG. 8 is arranged as a free-running oscillator circuit, and its output is taken from Pin 3 through resistor R88 to the transistor Q83, which controls current flow through load L8. Transistor Q83 is shown in FIG. 8 as being a bipolar transistor, but it may alternatively be implemented as a field-effect transistor. The output of the timer circuit IC8 is a square wave whose duty cycle is, in part, determined by the voltage at Pin 5, the control voltage input to timer circuit IC8. This voltage is manually controllable through the use of variable resistor VR8 (which would is coupled to a knob, slide, or the like, for user control).

Transistors Q81 and Q82, along with their surrounding resistors and capacitors, are arranged to form a low battery detection circuit. When the voltage of battery B8 decays below the threshold of Zener diode ZD8, transistor Q81 begins to turn off, thus reducing the voltage to the voltage divider network formed by resistor R82, variable resistor VR8, and resistor R817. This, in turn, reduces the control voltage input at Pin 5 of timer circuit IC8, resulting in a reduced duty cycle of the output square wave at Pin 3. As the battery voltage decays, the voltage at Pin 5 will approach zero, and therefore, the duty cycle of the output square wave will be zero. This effectively turns off the circuit, thus saving the battery from total decay. Transistor Q82 serves the purpose of "snapping off" transistor Q81 more abruptly, thus making the shut-off less linear.

The left-hand side of FIG. 8 consists of a voltage-regulated battery charging circuit. This battery charging circuit comprises transistors Q84, Q85, and Q86, as well as the surrounding components. An input (charging) voltage is obtained from DC plug P8. The output voltage of this battery charging circuit is a function of the voltage produced by the voltage divider comprised of resistors R814 and R815, this voltage being used to turn transistor Q85 on and off. A constant trickle charge is obtained through resistor R813 and diode D81.

The low voltage detection circuits described above accomplish two objects of the invention. First, the load power is automatically reduced to a lower level as the battery discharges, thus increasing "run time." Secondly, the battery is prevented from totally discharging, which could prevent the battery from being fully recharged to its rated value, in the case of a rechargeable battery.

Figure 6:
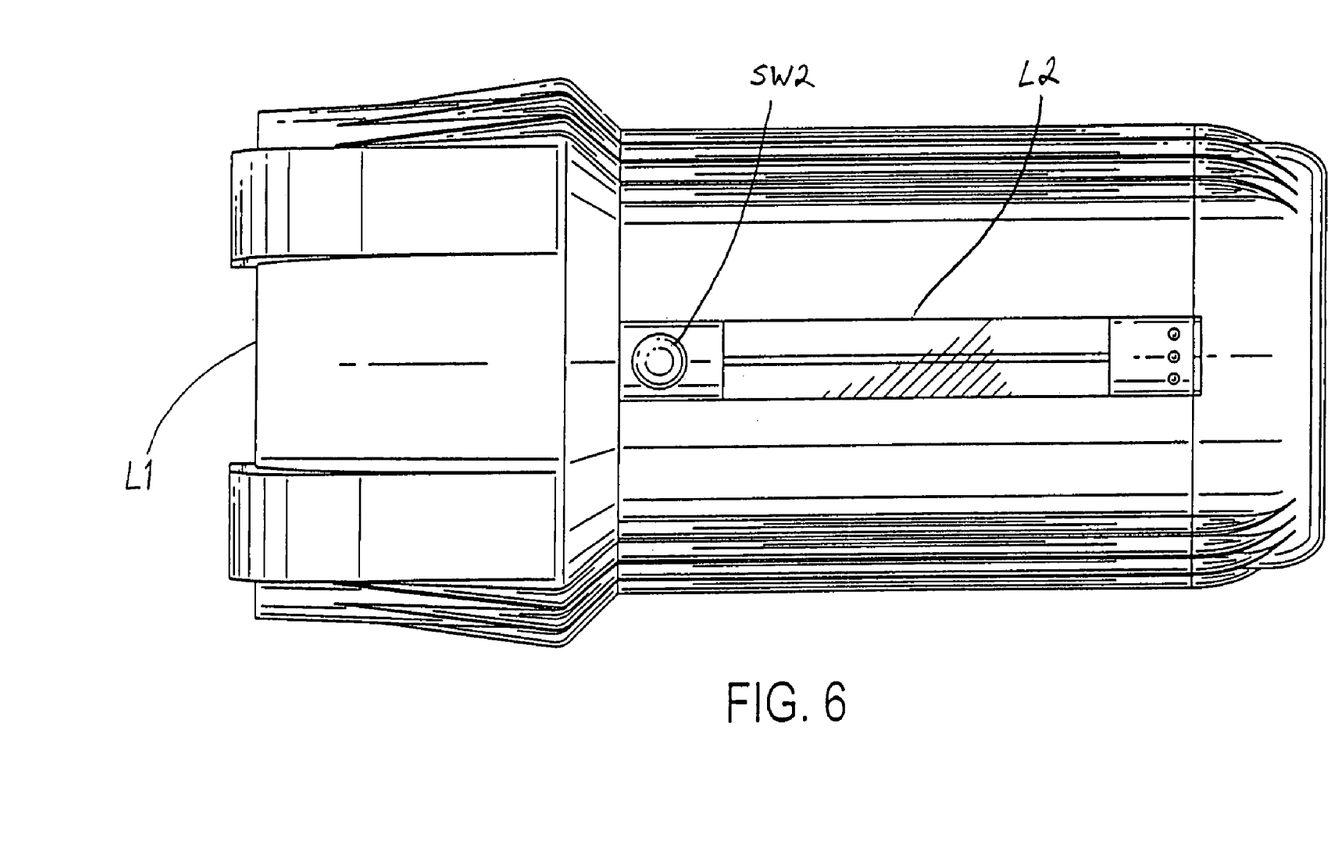
FIG. 6 shows a depiction of a lamp including an added cold-cathode fluorescent lamp.

As discussed above, a lamp may be embodied using any of the above-described control circuit embodiments by using an appropriate lighting element as load L1. FIG. 6 depicts a further embodiment of such a lamp, including an additional cold-cathode fluorescent lamp (CCFL). As shown in FIG. 6, in addition to lamp L1, there is a CCFL L2. CCFL L2 is turned on and off using switch SW2, which, in a preferred embodiment, is a push-button-type switch, but which may comprise any other appropriate switch.

Figure 7:
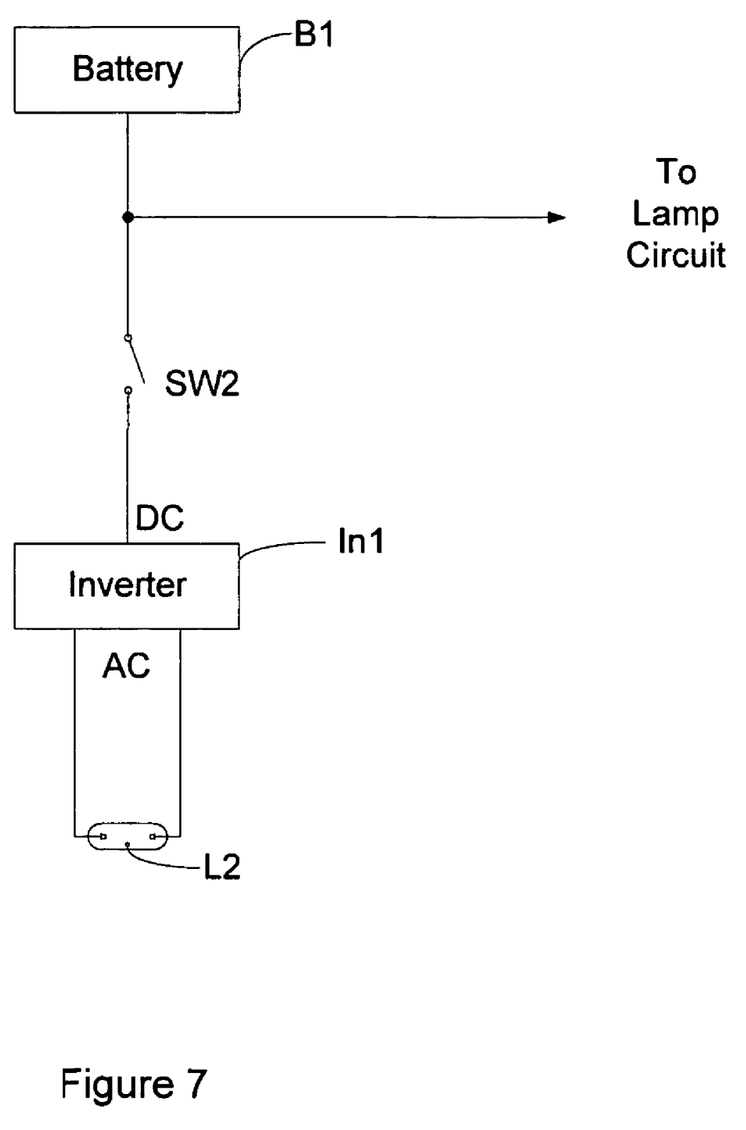
FIG. 7 shows a circuit schematic in partial block circuit form showing a cold-cathode fluorescent lamp circuit included in an embodiment of the invention shown in FIG. 6.

FIG. 7 depicts an embodiment of a circuit that supports the embodiment shown in FIG. 6. As shown, battery B1 is connected to the (L1) lamp circuit (i.e., one of the above-described embodiments), but it is further connected to provide DC power through switch SW2. When switch SW2 is depressed (or otherwise actuated) so as to turn on the CCFL, DC power is provided to inverter In1, which converts it to a relatively high-frequency, high-voltage, low-current AC signal. Lamp L2 is a CCFL. CCFLs are typically filled with a gas that activates to emit light at a voltage that lies between 180V and 800V. Inverter In1 acts to provide such a voltage at a low current level (in one implementation, the current was measured at 325 mA).

While FIG. 7 shows switch SW2 interposed between battery B1 and inverter In1, which is the preferred embodiment, switch SW2 could alternatively be interposed between inverter In1 and the CCFL L2.

The embodiments illustrated and discussed in this specification are intended only to teach those skilled in the art the best way known to the inventors to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described.

What is claimed is:

1. A control circuit for a load, comprising:
   a square wave generator producing a square wave output,
      a duty cycle of the square wave output being controllable by a control input of the square wave generator,
      the square wave output being coupled to the load; and
   a low voltage detection circuit for monitoring a voltage level of a power source and providing a control signal to the control input of the square wave generator, to thereby decrease the duty cycle of the square wave output when the voltage level of the power source decreases below a selected level.

2. The control circuit of claim 1, wherein the square wave generator comprises a comparator circuit having a threshold level set by the control input.

3. The control circuit of claim 2, further comprising:
a triangular wave oscillator producing a triangle wave signal, wherein the triangle wave signal is provided as input to the square wave generator for comparison to the threshold level by the comparator circuit.

4. The control circuit of claim 1, further comprising:
manual control means for varying the control signal input to the control input of the square wave generator.

5. The control circuit of claim 1, wherein the low voltage detection circuit comprises a control transistor, wherein the control transistor is gradually turned off as the voltage level of the power source decreases below the selected level.

6. The control circuit of claim 1, further comprising a switching means to which the square wave output is provided, to thereby control application of power to the load.

7. The control circuit of claim 1, further comprising a transistor coupled to the square wave generator and arranged so as to permit and shut off input to the square wave generator.

8. The control circuit of claim 1, further comprising:
a switching circuit having a terminal connected between the power source and the load and directly connected to a biasing resistor at an output of the square wave generator.

9. The control circuit of claim 1, wherein said low voltage detection circuit comprises at least one impedance, and wherein said selected level is selected according to at least one value of said at least one impedance.

10. The control circuit according to claim 9, wherein said at least one impedance includes at least two resistors, at least two of said resistors being connected in series, wherein values of said at least two of said resistors are chosen to determine said selected level.

11. The control circuit of claim 1, wherein a decrease in said duty cycle comprises a gradual decrease in duty cycle over a majority of a range of the voltage level of said power source below said selected level.

12. A method of controlling a load, comprising:
producing a controllable variable duty cycle square wave for controlling application of power to the load in accordance with a duty cycle of the square wave; and
detecting when a voltage of a power source decreases to a selected level, and upon such detection automatically producing a voltage that decreases the duty cycle of the square wave used for controlling application of power to the load.

13. The method of claim 12, further comprising the step of: manually controlling the duty cycle of the square wave to control an intensity of the load.

14. The method of claim 12, wherein the step of producing the controllable variable duty cycle square wave comprises the steps of:
providing a fixed frequency triangular wave; and
comparing the triangular wave to a threshold voltage, thereby producing the square wave.

15. The method of claim 14, wherein the voltage that decreases the duty cycle of the square wave, produced by the detecting step, determines the threshold voltage.

16. The method of claim 15, further comprising:
manually adjusting the voltage that decreases the duty cycle of the square wave, produced by the detecting step, so as to manually adjust the threshold voltage.

17. The method of claim 12, further comprising:
controlling a current flow through the load using a timer circuit that acts as a control signal generator.

18. The method of claim 12, further comprising:
selecting electrical component values to determine said selected level.

19. The method of claim 12, wherein said automatically producing a voltage that decreases the duty cycle of the square wave used for controlling application of power to the load comprises:
automatically producing a voltage that produces a gradual decrease in the duty cycle of the square wave used for controlling application of power to the load over a majority of a range of voltages of said power source below said selected level.

20. A pulse-width modulation (PWM)-based lamp control circuit comprising:
a square wave generator for producing a square wave output, a duty cycle of the square wave output being controllable by a control input of the square wave generator, the square wave output being coupled to a lamp; and
a low voltage detection circuit for monitoring a voltage level of a power source and providing a control signal to the control input of the square wave generator, to thereby decrease the duty cycle of the square wave output when the voltage level of the power source decreases below a selected level.

21. The control circuit of claim 20, wherein the square wave generator comprises a comparator circuit having a threshold level set by the control input.

22. The control circuit of claim 21, further comprising:
a triangular wave oscillator producing a triangle wave signal, wherein the triangle wave signal is provided as input to the square wave generator for comparison to the threshold level by the comparator circuit.

23. The control circuit of claim 20, further comprising:
manual control means for varying the control signal input from the low voltage detection circuit to the control input of the square wave generator.

24. The control circuit of claim 20, wherein the low voltage detection circuit comprises a control transistor, wherein the control transistor is gradually turned off as the voltage level of the power source decreases below the selected level.

25. The control circuit of claim 20, further comprising a switching means to which the square wave output is provided, to thereby control application of power to the lamp.

26. The control circuit of claim 25, wherein the switching means comprises a transistor, said control circuit further comprising:
a biasing resistor connected between a terminal of the power source and a base of the transistor.

27. The control circuit of claim 20, further comprising a transistor coupled to the square wave generator and arranged so as to permit and shut off input to the square wave generator.

28. A DC-powered lamp comprising the control circuit of claim 20 and further comprising:
a cold-cathode fluorescent lamp, controlled independently of the control circuit of claim 20.

29. The control circuit of claim 20, wherein the square wave generator comprises a timer circuit.

30. The control circuit of claim 20, further comprising:
a switching circuit having a terminal connected between the power source and the load and directly connected to a biasing resistor at an output of the square wave generator.

31. The control circuit of claim 20, wherein said low voltage detection circuit comprises at least one impedance, and wherein said selected level is selected according to at least one value of said at least one impedance.

32. The control circuit according to claim 31, wherein said at least one impedance includes at least two resistors, at least two of said resistors being connected in series, wherein values of said at least two of said resistors are chosen to determine said selected level.

33. The control circuit of claim 20, wherein a decrease in said duty cycle comprises a gradual decrease in duty cycle over a majority of a range of the voltage level of said power source below said selected level.

* * * * *